E. E. F. CREIGHTON.
PROTECTIVE DEVICE.
APPLICATION FILED FEB. 10, 1914.
1,099,968. Patented June 16, 1914.
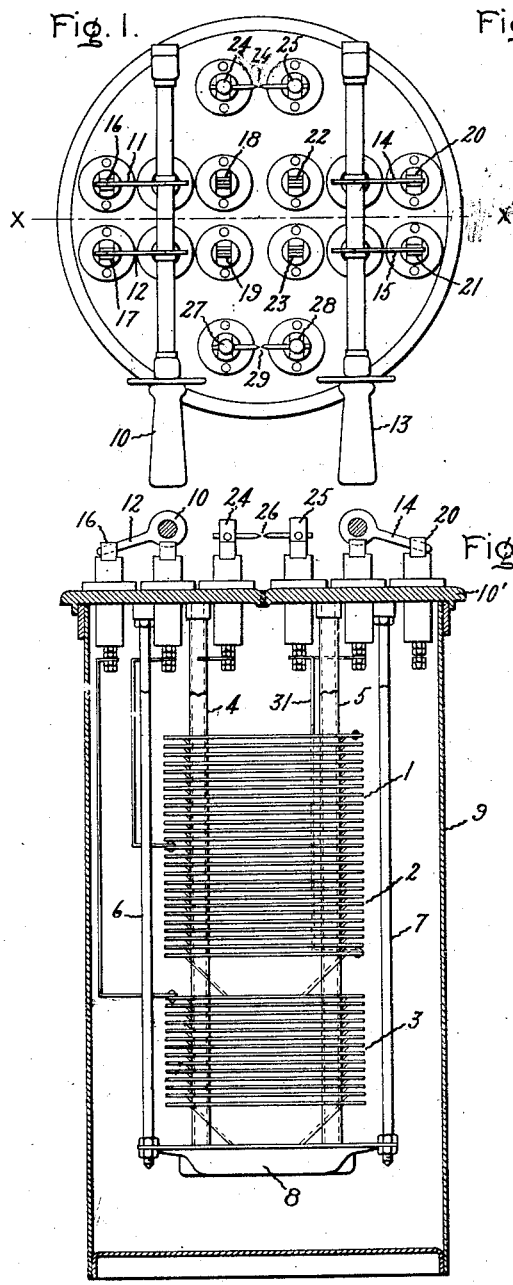
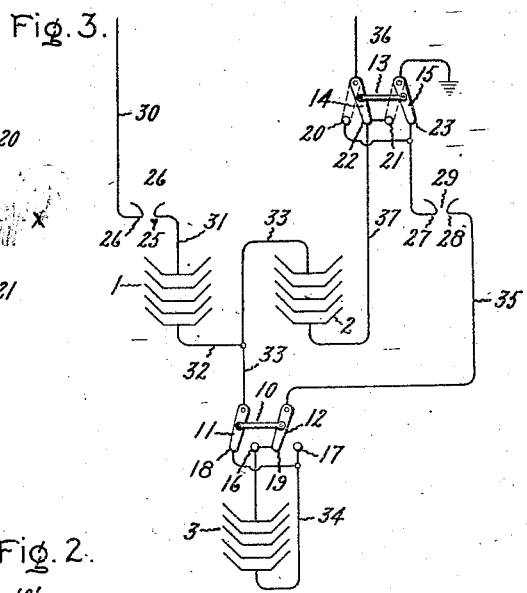
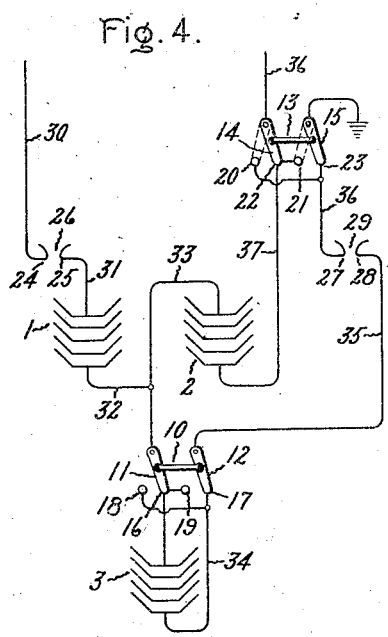
WITNESSES:
INVENTOR:
ELMER E. F. CREIGHTON,
BY
HIS ATTORNEY.

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

PROTECTIVE DEVICE.

1,099,968. Specification of Letters Patent. Patented June 16, 1914.

Application filed February 10, 1914. Serial No. 817,921.

*To all whom it may concern:*

Be it known that I, ELMER E. F. CREIGHTON, a citizen of the United States, residing at Schenectady, county of Schenectady, State of New York, have invented certain new and useful Improvements in Protective Devices, of which the following is a specification.

My invention relates to devices for the protection of electrical systems of distribution from lightning and other abnormal conditions and more particularly to electrolytic lightning arresters of the well known aluminum cell type.

The object of my invention is to provide an electrolytic lightning arrester of the aluminum cell type in which the cells are so arranged that the ground cell can be suitably charged to prevent current flow through the cell in either direction; in which the cells are arranged in proper relation to each other to provide a uniform and compact structure; and which is in other features, to be hereinafter more fully set forth, an improvement in arresters of this general character.

My invention will be more clearly understood from the following description, taken in connection with the accompanying drawings, in which—

Figure 1 is a top elevation of my novel arrester showing the operating switches; Fig. 2 is a vertical sectional view through the arrester, taken along the line $x$, $x$ of Fig. 1, showing the novel connections and structure of the cell units; and Figs. 3 and 4 show diagrammatically, the embodiment of the novel features of my invention as applied to the protection of direct current circuits.

In Fig. 2 the legs or cell units 1, 2, and 3 are shown as of the usual cone or cup shape, suitably nested together and filled with electrolyte. The leg or cell unit 1 is connected to one side of the line to be protected and the legs or cell units 2 and 3 are arranged to be interchangeable, either cell unit being capable of connection to the other side of the line or to ground. If cell unit 2 is connected to the other side of the line, then cell unit 3 is a common ground unit between cell line 1 and 2 and vice versa. The cell units are shown in Fig. 2 mounted upon suitable insulating rods 4 and 5 and supporting this stack of cells and holding them rigidly in place, is a rack consisting of the rods 6 and 7 bolted to a base plate 8. The cell units and supporting structure are suitably inclosed in a tank 9, to the cover 10' of which, the rods 6 and 7 are securely fastened, thus suspending the cell units in the oil with which the tank 9 is filled.

Suitably mounted upon the top or cover 10' of the arrester tank 9 are two double throw switches, the reversing switch 10 carrying contact or switch blades 11 and 12 and the transfer switch 13 carrying contact or switch blades 14 and 15. In Fig. 1 the reversing switch 10 is shown with its contact or switch blades 11 and 12 in engagement with the contacts or terminals 16 and 17, respectively which are mounted upon the cover 10', the switch being merely rotated to throw the switch blades out of engagement with the contacts 16 and 17 and into engagement with the coöperating contacts or terminals 18 and 19 respectively, which are also mounted upon the cover 10'. The transfer switch 13 is actuated in the same manner to throw its switch blades 14 and 15 into engagement with contacts or terminals 20 and 21 respectively, as shown in Fig. 1, or into engagement with corresponding contacts or terminals 22 and 23 respectively, both sets of contacts or terminals being mounted upon the switch cover 10'. The functions and mode of operation of these switches will be hereinafter more fully described. Mounted also upon the cover 10' of the tank 9 are two pairs of terminals 24 and 25 between which is formed the spark gap 26 and terminals 27 and 28 between which is formed the spark gap 29.

The connections between the switches 10 and 13 and their respective coöperating contacts and the cell units or legs 1, 2 and 3 are best shown in Fig. 3 which represents, diagramatically, the connections and switches as shown in Figs. 1 and 2, cell unit 1 protecting one side of the line, cell unit 2 protecting the other side of the line and cell unit 3 as the common ground unit. One conductor 30 of the line to be protected is connected to terminal 24 and the path for the discharge current from conductor 30 is across spark gap 26 to terminal 25 and by conductor 31 to the top of cell unit or leg 1, thence through the cell unit 1 and through wires 32 and 33 to the switch blade 11 of the reversing switch 10. The discharge passes through switch blade 11 to the terminal or contact 18 and thence through wire 34 to the bottom of the ground unit or leg 3 and up through the ground unit 3 to a contact or terminal 16. As the contacts or terminals 16 and 19 are connected together, the discharge current will pass from contact 16 to contact 19, thence through the other switch blade 12 of the reversing switch 10, along the wire 35, to contact or terminal 28, across the spark gap 29 to contact or terminal 27 and thence to contact 23. As the transfer switch 13 is in the position shown in full lines, the current will pass from contact 23 through the switch blade 15 of the transfer switch 13 and on to ground. A discharge from the other side of the line to be protected will pass along conductor 36 through the switch blade 14 of the transfer switch 13 to terminal or contact 22, thence along wire 37 to the bottom of line unit or leg 2, up through the cells of unit 2 and thence through wire 33 to the switch blade 11 of reversing switch 10. From the switch blade 11, the discharge current follows the same path as the discharge current from the other side of the line, namely up through the ground unit or leg 3, through switch blade 15 of transfer switch 13 and thence to ground. In this arrangement the cell unit or leg 1 is protecting one side of the line, cell unit or leg 2 is protecting the other side of the line and cell unit or leg 3 is the common ground unit between the two cells through which both units 1 and 2 discharge to ground. For this arrangement of the cell units, as shown in Fig. 3, the switch blades 11 and 12 of reversing switch 10 are in engagement with contacts or terminals 18 and 19 respectively and the switch blades 14 and 15 of transfer switch 13 are in engagement with contacts or terminals 22 and 23 respectively, as indicated in heavy lines.

In my novel protective device I provide for the complete protection of the system, that the ground unit is arranged to be charged in both directions, that is the insulating film is deposited on both sides of the electrodes of the ground unit. If the unit is only charged in one direction, as is the present practice, then as insulating film is produced on only one side of the electrodes and the unit therefore is in danger of taking too much energy from the circuit and thereby causing disturbances in the operation of the apparatus. Furthermore the cells may be damaged by the heavy rush of current needed to reform a thoroughly dissolved film. It is, therefore, the function of the reversing switch 10 to charge the ground unit or leg 3 first in one direction and by rotating the switch so as to bring the switch blades 11 and 12 in engagement with contacts or terminals 16 and 17 respectively, to charge the ground unit in the other direction. To charge the ground unit 3, it is electrically transferred to a line unit by the transfer switch 13, at which time one of the line units, as for instance line unit 2 is temporarily transferred to a ground unit. This operation is performed by the transfer switch 13 in a manner to be more fully explained.

Assume that the film upon the electrodes of ground unit 3 has become deteriorated for some reason and it is necessary to charge the unit, the transfer switch is first thrown from the position shown in full lines in Fig. 3 to the position shown in dotted lines. The transfer switch in rotating causes its switch contacts 14 and 15 to break engagement with contacts or terminals 22 and 23 respectively and to come into engagement with contacts or terminals 20 and 21 respectively. The discharge current from conductor 30 now passes the same way as before, through its protective cell unit 1 but instead of going through cell unit or leg 3, it passes along wire 33 to the top of cell unit 2, through this unit and along wire 37 to contact or terminal 22. As contacts or terminals 22 and 21 are connected, the discharge current will pass from contact 22 to contact 21 and thence to ground through switch blade 15 of transfer switch 13. The discharge current from the conductor 36 will pass through the switch blade 14 of transfer switch 13 to contact or terminal 20, thence across the spark gap 29, along wire 35 to switch blade 12 of reversing switch 10, through the switch blade to contact 19, to contact 16 down, down through the cell unit 3 and out along wire 34 to contact 18, through switch blade 11 of the reversing switch 10, along wire 33 to the top of cell unit 2 and to ground in the same manner as the discharge current from the other side of the line. In this manner the transfer switch 13 with its switch blades 14 and 15 in engagement with contacts or terminals 20 and 21 respectively, changes electrically the ground unit 3 to a line unit replacing for purposes of protection the line unit 2 which is now a ground unit.

With the reversing switch in the position shown in Fig. 3 and the transfer switch in the position shown in dotted lines, the ground unit 3 is electrically a line unit and is now in a position to be charged. This is done by bridging the spark gaps 26 and 29 in any suitable manner causing the line current to pass through conductor 30, through the short circuited spark gap 26, along wire 31 to the top of cell unit 1, down through this unit, charging it, and thence along wires 32 and 33 to switch blade 11, contact 18, through wire 34 and up through the cell unit 3 to contact 19, through switch blade 12, wire 35, across the short circuited spark gap 29 to contact 20, and through switch blade 14 to conductor 36 and the other side of the line. In this manner the passage of line current charges cell unit 1 in the proper direction and charges cell unit 3 in the upward direction. The next step is to rotate reversing switch 10 whereby its switch blades 11 and 12 break engagement with contacts 18 and 19 respectively and come into engagement with contacts 16 and 17 respectively as shown in Fig. 4. By so doing the line current from conductor 30 passes along the same path to the conductor 36 but in passing through the cell unit 3 its direction is reversed, this time the current going down through the cell unit instead of up through it, thus charging the unit in the downward direction. By the reversing switch 10 therefore, the cell unit 3 is charged in both directions. Being in a charged condition it is now in a position to be transferred back to a ground unit and this transfer is accomplished by first removing the bridging members from the spark gaps 26 and 29 and then by rotating the transfer switch 13 so that its switch blades 14 and 15 break engagement with the contacts 20 and 21 respectively and come into engagement with contacts 22 and 23 respectively. Now the cell unit 3 is again the ground unit and the cell unit 2 is a line unit. The cell unit 2 can now be charged by merely bridging the spark gap 26 and the line current passes down through cell unit 1 along wire 33, down through cell unit 2, along wire 37, to switch blade 14 and the conductor 36 to the other side of the line.

In my novel protective scheme, I have devised a protective device of the aluminum cell type which efficiently protects, not only both sides of the line from abnormal conditions occurring on the line, but also protects both sides of the line from ground for a current flow in either direction. The various protective cell units of my novel protective device are arranged for housing in the same tank so that a complete, compact and economical arrester is produced.

My invention may be embodied in other forms than those herein described and I, therefore, do not desire to limit myself to the precise arrangement disclosed except in so far as it is limited by the scope of the appended claims.

What I claim as new and desire to secure by Letters Patent of the United States, is:—

1. In a protective device for electric circuits, the combination with a plurality of electrolytic cells arranged in units comprising, line units connected to each side of the circuit to be protected, and a ground unit arranged to form a common discharge path between said line units and ground, of means for electrically changing said ground unit to a line unit, and means for charging said ground unit in both directions when said unit is in line unit position.

2. In a protective device for electric circuits, the combination with a plurality of electrolytic cells arranged in units comprising, line units connected to each side of the circuit to be protected, and a ground unit arranged to form a common discharge path between said line units and ground, of a transfer switch adapted to electrically change said ground unit to a line unit, and means for charging said ground unit in both directions when said unit is in line unit position.

3. In a protective device for electric circuits, the combination with a plurality of electrolytic cells arranged in units comprising, line units connected to each side of the circuit to be protected, and a ground unit arranged to form a common discharge path between said line units and ground, of means for electrically interchanging said ground unit and one of said line units, and a reversing switch for reversing the current flow through the ground unit when in line unit position whereby the ground unit is charged in both directions.

4. In a protective device for electric circuits, the combination with a plurality of electrolytic cells housed in the same tank and arranged in units comprising, line units connected to each side of the circuit to be protected and a ground unit arranged to form a common discharge path between said line units and ground, of spark gaps between one of said line units and the line to be protected and between said ground unit and ground, contacts adapted when bridged to electrically interchange said ground unit and one of said line units, said spark gaps being bridged to cause said ground unit to be charged in one direction while in line unit position, and other contacts adapted to be bridged while said ground unit is in line unit position to charge said ground unit in the opposite direction.

5. In a protective device for electric circuits, the combination with three electrolytic cell units, one of said units being connected to one side of the circuit to be protected, of means for connecting at will either one of the other two cell units to the other side of the circuit to be protected, the remaining cell unit forming a common ground unit in the discharge path between said line units and ground, and means whereby said ground unit when in line unit position is charged first in one direction and then in the other direction.

6. In a protective device for electric circuits, the combination with three electrolytic cell units, one of said units being connected to one side of the line to be protected, of means for connecting simultaneously either one of the other two cell units to the other side of the line to be protected and the remaining cell unit to ground, and means for causing the line current to pass through the unit connected to said other side of the circuit first in one direction and then in the opposite direction whereby said unit is charged in both directions.

7. In a protective device for electric circuits, the combination with three electrolytic cell units, one of said units being connected to each side of the circuit to be protected and the remaining unit forming a common discharge path to ground, of means for causing line current to pass through one of said line units first in one direction and then in the opposite direction whereby said unit is charged in both directions, and means for interchanging said line unit with said ground unit after said line unit is charged.

8. In a protective device for electric circuits, the combination of a line unit composed of electrolytic cells connected to one side of the circuit to be protected, two interchangeable units composed of electrolytic cells adapted to be connected to the other side of the circuit to be protected or to ground, a switch for electrically interchanging said two units, and means for causing line current to pass through either one the interchangeable units first in one direction and then in the opposite direction whereby said unit is charged in both directions.

9. In a protective device for electric circuits, the combination with three electrolytic cell units comprising, line units connected to each side of the circuit to be protected, and a ground unit forming a common discharge path between said line units and ground, of spark gaps between one of said line units and ground and between said ground unit and ground, a transfer switch adapted to electrically interchange said ground unit with one of said line units, means for bridging said spark gaps when said ground unit is interchanged with said line unit whereby said ground unit is charged by line current in one direction, and a reversing switch adapted to reverse the current flow through said ground unit while said unit is still in line unit position whereby said ground unit is charged in the reverse direction.

10. In a protective device for electric circuits, the combination with three electrolytic cell units comprising, a permanent line unit connected to one side of the circuit to be protected, a temporary line unit connected to the other side of the circuit to be protected, and a ground unit adapted to be electrically interchanged with said temporary line unit, of spark gaps between said permanent line unit and the circuit to be protected and between said ground unit and ground, a transfer switch adapted to electrically interchange said ground unit with said temporary line unit whereby said ground unit is placed in line unit position and said temporary line unit in ground unit position, said spark gaps being bridged when said ground unit is in line unit position to cause the line current to pass through said ground unit in one direction, and a reversing switch adapted to reverse the direction of current flow through said ground unit whereby said ground unit is charged in both directions, said ground unit being returned to normal position by said transfer switch after being charged in both directions.

In witness whereof, I have hereunto set my hand this 9th day of February, 1914.

ELMER E. F. CREIGHTON.

Witnesses:
HELEN ORFORD,
MARGARET E. WOOLLEY.